United States Patent
Niccolls et al.

(10) Patent No.: US 9,016,324 B2
(45) Date of Patent: Apr. 28, 2015

(54) METHODS FOR JOINING PIPE SECTION IN A PIPE SYSTEM CONTAINING CORROSIVE PETROLEUM PRODUCTS

(75) Inventors: Edwin H. Niccolls, Danville, CA (US); Andrew O'Connor, Katy, TX (US); Grzegorz Jan Jusinski, Moraga, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 925 days.

(21) Appl. No.: 12/761,582

(22) Filed: Apr. 16, 2010

(65) Prior Publication Data

US 2010/0263195 A1 Oct. 21, 2010

Related U.S. Application Data

(60) Provisional application No. 61/170,080, filed on Apr. 16, 2009.

(51) Int. Cl.
*F16L 9/14* (2006.01)
*B23P 6/00* (2006.01)
(Continued)

(52) U.S. Cl.
CPC . *C04B 35/16* (2013.01); *B32B 1/08* (2013.01); *B32B 37/00* (2013.01); *C04B 35/6263* (2013.01); *C04B 2235/349* (2013.01); *F16L 57/04* (2013.01); *F16L 58/181* (2013.01)

(58) Field of Classification Search
CPC .... B29C 70/086; B29C 70/86; F16L 55/1686
USPC .......... 29/458, 402.09, 402.18; 138/140–144, 138/98–99, 172; 428/36.4, 36.91, 428/34.1–34.6
See application file for complete search history.

(56) References Cited

U.S. PATENT DOCUMENTS

| 4,382,884 A | 5/1983 | Rohringer et al. |
| 4,568,014 A | 2/1986 | Madsen |

(Continued)

FOREIGN PATENT DOCUMENTS

| JP | 2006088201 A | 4/2006 |
| WO | WO0134724 | 5/2001 |

(Continued)

OTHER PUBLICATIONS

Pending related case U.S. Appl. No. 12/761,698, filed Apr. 16, 2010.
(Continued)

*Primary Examiner* — Minh Trinh
(74) *Attorney, Agent, or Firm* — Melissa Patangia

(57) ABSTRACT

A method to form a pipe system which meets level II fire endurance standard according to IMO A 18/Res.753 fire testing protocol, for use in oil, gas, exploration, refining and petrochemical applications is provided. In the pipe system, each pipe section comprises a plurality of layers, an inner layer in contact with the corrosive petroleum product comprising a thermoplastic material, a structural layer comprising a composite material, and an outer layer comprising a fire resistive material. The method comprises applying energy to join the corrosion resistant layers of the separate pipe sections together forming a joint, applying an external wrap around the joint and at least a portion of the composite structural layers of the at least two pipe sections, and bonding the external wrap to the joint and the composite structural layers by chemical curing, thermal treatment, or combinations thereof.

12 Claims, 4 Drawing Sheets

(51) Int. Cl.
*C04B 35/16* (2006.01)
*B32B 1/08* (2006.01)
*B32B 37/00* (2006.01)
*C04B 35/626* (2006.01)
*F16L 57/04* (2006.01)
*F16L 58/18* (2006.01)

(56) References Cited

U.S. PATENT DOCUMENTS

| | | | |
|---|---|---|---|
| 4,752,537 A | 6/1988 | Das | |
| 4,842,923 A | 6/1989 | Hartman | |
| 4,942,903 A * | 7/1990 | Jacobsen | 138/110 |
| 5,024,877 A * | 6/1991 | McCullough et al. | 442/38 |
| 5,236,773 A | 8/1993 | Sorathia et al. | |
| 5,433,991 A | 7/1995 | Boyd, Jr. et al. | |
| 5,552,185 A | 9/1996 | De Keyser | |
| 5,571,625 A * | 11/1996 | Porte et al. | 428/447 |
| 5,765,600 A | 6/1998 | Newaz et al. | |
| 5,799,705 A * | 9/1998 | Friedrich et al. | 138/144 |
| 5,840,105 A | 11/1998 | Helmstetter | |
| 5,938,976 A | 8/1999 | Heimann et al. | |
| 5,993,570 A | 11/1999 | Gray | |
| 6,001,437 A | 12/1999 | Thorpe et al. | |
| 6,116,290 A | 9/2000 | Ohrn et al. | |
| 6,205,728 B1 | 3/2001 | Sutelan | |
| 6,230,751 B1 | 5/2001 | Sjotun | |
| 6,276,401 B1 * | 8/2001 | Wilson | 138/172 |
| 6,403,180 B1 | 6/2002 | Barrall | |
| 6,546,963 B2 * | 4/2003 | Nuss | 138/141 |
| 6,551,951 B1 | 4/2003 | Fay et al. | |
| 6,585,298 B2 * | 7/2003 | Pålsson | 285/294.2 |
| 6,688,338 B2 | 2/2004 | Meli et al. | |
| 6,953,129 B2 | 10/2005 | DeLay | |
| 7,044,324 B2 | 5/2006 | Goodson et al. | |
| 7,105,047 B2 | 9/2006 | Simmons et al. | |
| 7,267,844 B2 | 9/2007 | Branagan | |
| 7,323,509 B2 | 1/2008 | Van Dine | |
| 7,482,395 B2 | 1/2009 | Mabey et al. | |
| 7,534,321 B2 * | 5/2009 | Fawley | 156/304.1 |
| 2002/0119717 A1 | 8/2002 | Taylor, Jr. et al. | |
| 2002/0185188 A1 | 12/2002 | Quigley et al. | |
| 2004/0054035 A1 | 3/2004 | Hallissy et al. | |
| 2004/0067369 A1 | 4/2004 | Ott et al. | |
| 2004/0185256 A1 | 9/2004 | Zastrow | |
| 2005/0031843 A1 | 2/2005 | Robinson et al. | |
| 2005/0120715 A1 | 6/2005 | Labrador | |
| 2005/0236061 A1 | 10/2005 | Estefen et al. | |
| 2006/0053738 A1 | 3/2006 | Jaffee | |
| 2006/0083878 A1 | 4/2006 | Bauman | |
| 2006/0127622 A1 | 6/2006 | Mohan et al. | |
| 2006/0137757 A1 | 6/2006 | McKeen et al. | |
| 2006/0182915 A1 * | 8/2006 | Frost et al. | 428/36.9 |
| 2006/0229395 A1 | 10/2006 | Hsu et al. | |
| 2007/0023420 A1 | 2/2007 | Gagas | |
| 2007/0066491 A1 | 3/2007 | Bicerano et al. | |
| 2007/0074872 A1 | 4/2007 | Du et al. | |
| 2007/0084554 A1 | 4/2007 | Miller et al. | |
| 2007/0125439 A1 | 6/2007 | Quigley et al. | |
| 2007/0144621 A1 | 6/2007 | Farmer et al. | |
| 2007/0145584 A1 | 6/2007 | Kataoka et al. | |
| 2007/0173553 A1 | 7/2007 | Taylor, Jr. | |
| 2008/0003125 A1 | 1/2008 | Peterson et al. | |
| 2008/0053554 A1 | 3/2008 | Salama | |
| 2008/0155985 A1 | 7/2008 | Labrador | |
| 2008/0214381 A1 | 9/2008 | Balaguru | |
| 2009/0042022 A1 * | 2/2009 | Lally | 428/332 |
| 2009/0046825 A1 | 2/2009 | Dulka et al. | |
| 2009/0215926 A1 * | 8/2009 | Kozlowski et al. | 523/179 |
| 2010/0075221 A1 | 3/2010 | Mehta et al. | |
| 2010/0139800 A1 * | 6/2010 | Burke et al. | 138/134 |
| 2010/0154917 A1 * | 6/2010 | Batallas et al. | 138/141 |
| 2010/0300572 A1 | 12/2010 | Dowe et al. | |

FOREIGN PATENT DOCUMENTS

| | | |
|---|---|---|
| WO | WO2007109784 | 9/2007 |
| WO | WO2008017147 | 2/2008 |
| WO | WO2008061087 | 5/2008 |
| WO | WO2008068303 | 6/2008 |
| WO | WO2008122989 | 10/2008 |
| WO | WO2008125682 | 10/2008 |
| WO | WO2009027429 A2 | 3/2009 |
| WO | WO2009027429 A2 | 3/2009 |

OTHER PUBLICATIONS

Pending related case U.S. Appl. No. 12/761,631, filed Apr. 16, 2010.
PCT International Search Report on PCT/US2010/031409 mailed Nov. 26, 2010.
PCT Search Report and Written Opinion related to PCT/US2010/032788 mailed Jan. 3, 2011.
U.S. Appl. No. 12/761,687, filed Apr. 16, 2010, Kusinski et al.
U.S. Appl. No. 12/761,673, filed Apr. 16, 2010, Niccolls et al.
U.S. Appl. No. 12/761,631, filed Apr. 16, 2010, Kusinski et al.
U.S. Appl. No. 12/761,698, filed Apr. 16, 2010, Niccolls et al.
Underground Petroleum Piping Systems, Sausville et al., New York State Department of Environmental Conservation Bulk Storage Section Mar. 1998.
Fiberglass Reinforced Plastic (FRP) Piping Systems, Schmit, Jul. 1998.
Decomposition of Intumescent Coatings, Mesquita et al., Acta Polytechnica vol. 49 No. 1/2009.
Temperature distribution of intumescent coated steel framed connection at elevated temperature, Krishnamoorthy et al., NSCC 2009.
Pressure Vessel Technology Developments, Pauken et al., Jet Propulsion Lab, 2006.
Making Decisions with Insulation—http://www.cheresources.com/insulationzz.shtm1.
Case History: PTFE-lined Pipe Failure, Schisla, Process Safety Progress, vol. 21, No. 1, 2002.
Microstructure and Thermal Conductivity of Hydrated Calcium Silicate Board Materials, Do et al, Journal of Building Physics (2007).
An Experimental Study of Intumescent Fire Protection Coatings, Mesquita et al., International Advanced Research Workshop in Fire Computer Modeling. Santander, 2007.
Sealing Sense, Pumps & Systems, Dec. 2006.
Insulation Materials: Calcium Silicate Block and Pipe, Hart et al., 1996 http://www.insulationoutlook.com/articles/article.cfm?id=IO080904.
PureBond Pipe Welding Tool Operations Manual—Dimensional Welding, 2004.
Dimensional welding, PurePond, 2004.
Thermal Barrier Coatings, Chapter 2, Thesis, University of Virginia http://www.google.com/search?hl=en&rls=com.microsoft%3A*&q=Chapter+2+thermal+expansion+coefficient&aq=f&aqi=aql=oq=&gs_rfai=.
Effect of Temperature. Excursion on Sulfidation of Carbon Steel, Al-Hassan et al., IPST Technical Paper Series No. 712, Mar. 1998.
Characterisation of Passive Fire Protection (PFP) Materials Against Jet-Fire Impingement, Oct. 2, 2000.
Use of Composite Pipe Materials in the Transportation of Natural Gas, Laney, Idaho National Engineering and Environmental Laboratory, 2002.
Prediction of Intumescent Coating Performance Under Cone Calorimeter—A Mathematical Approach to Performance Based Design, Yuan et al, Proceedings of the Fifth International Conference on Structures in Fire (2008).
PCT International Search Report and Written Opinion, International Application No. PCT/US2010/031409, dated Oct. 18, 2011. pp. 1-7.
U.S. Appl. No. 12/761,673, filed Apr. 16, 2010, Kusinski et al.
U.S. Appl. No. 12/761,631, filed Apr. 16, 2010, Niccolls et al.

* cited by examiner

METHODS FOR JOINING PIPE SECTION IN A PIPE SYSTEM CONTAINING CORROSIVE PETROLEUM PRODUCTS

CROSS-REFERENCE TO RELATED APPLICATIONS

This application claims benefit under 35 USC 119 of U.S. Provisional Patent Application No. 61/170,080 with a filing date of Apr. 16, 2009. This application claims priority to and benefits from the foregoing, the disclosure of which is incorporated herein by reference.

TECHNICAL FIELD

The invention relates generally to the use of advanced materials, e.g., composites, cermet linings, amorphous metals, corrosion resistant materials, thermal resistant coatings, etc., in oil and gas exploration, refining and petrochemical applications.

BACKGROUND

It is known that petroleum products, i.e., gas and liquid hydrocarbon products, contain or have associated with them corrosive materials such as carbon dioxide, hydrogen sulfide, and chlorides, etc. Aqueous fluids, such as those used in drilling and completion, can contribute salts, amines, acids, or other contaminants, causing the fluids to be corrosive. Crudes with high organic acid content such as those containing naphthenic acids are corrosive to the equipment used to extract, transport, and process the oil. Gases, such as hydrogen chloride, carbon dioxide and hydrogen sulfide generate highly acidic environments in the presence of aqueous conditions to which metallic surfaces become exposed. Further, naturally occurring and synthetic gases are often conditioned by treatment with absorbing acidic gases, e.g., carbon dioxide and hydrogen sulfide. Degradation of the absorbent and acidic components, as well as the generation of by-products, results in corrosion of metallic surfaces.

Besides the corrosion issue, there is a risk of leakage and associated fire protection and fire resistant issues in the handling of petroleum products. A loss of containment in any portion of the piping system may result in a high temperature, high heat flux, high velocity flame, frequently termed a "jet fire." When there is a jet fire, extreme heat flux densities may occur together with high temperatures, depending on the nature of the fire. In the case of a fire involving the combustion of solid fuels (unlikely in most hydrocarbon processing operations), the temperature of the fire increases continuously and can be at 900° C. after 60 minutes, about 1050° C. after 120 minutes, and up to 1150° C. after 240 minutes. The heat flux density can reach up to 100 kW/m$^2$. By comparison in hydrocarbon pool fires, the temperature rise can be more rapid and a temperature of 1150° C. can be reached after 20 minutes and with a heat flux density of 225 kW/m$^2$. With a jet fire when natural gas and different condensates burn under high pressure, temperature can rise to 1300-1400° C. in a matter of seconds, with a heat flux density going up to 500 kW/m$^2$.

Various approaches to controlling corrosion have been employed in the oil and gas industry including periodic monitoring and planned replacement of equipment, corrosion inhibitors, and equipment material upgrades. Operators select the appropriate approach, or combination of approaches, depending upon the nature, complexity, and predictability of the corrosion, the likelihood and consequences of equipment failure, and the ability to monitor and inhibit the corrosion. Each approach has risks and drawbacks. It is often not possible to monitor and plan an economic replacement schedule for equipment with a high degree of certainty. The use of inhibitors can have unintended side effects, such as moving the corrosion to other parts of the process or possibly posing some environmental concerns. When the cause of the corrosion is not known with certainty, or the causes of corrosion are numerous, or the corrosion varies with process changes, the selection of a resistant material is difficult and almost always very expensive.

Expensive steels and alloys, e.g., stainless steel, nickel-based high alloys, etc. materials, have been used in the oil & gas industry. Thermal cycling or thermal excursion has been known to affect structural components comprising metals in high-temperature oil & gas applications. Corrosion resistant fluoropolymer plastics such as Teflon™ can be used as liners in metal piping system. However, lined metal pipe systems can fail due to the differences in the physical properties of the liner and the metal pipe (e.g., viscoelastic properties due to thermal cycling). Teflon™ fluoropolymer plastic has a coefficient of thermal expansion that is ten times greater than carbon steel over a wide temperature range, but it is 75 times greater at 70° F. Teflon™ fluoropolymer plastic has an elastic modulus ranging from 58 to 80 MPa as compared to carbon steel with an elastic modulus of 190,000 MPa-210,000 MPa.

Because composite non-metallic materials provide improved corrosion resistance and reduced maintenance requirements, they have been employed as replacement of expensive steels and alloys. However, when structural components comprising nonmetallic composite materials are heated to their ignition or combustion support temperatures by heat transfer from a near-by flame, the materials ignite and/or support combustion, lose structural integrity, and evolve large quantities of smoke while burning. Further, the non-metallic materials must resist not only the temperatures and pressures encountered in oil and gas applications, but they almost must withstand the solvent, embrittling and other potential degrading properties of the hydrocarbons and contaminants contained in the process streams.

There is a continuing need for improved structural components with corrosion resistance and fire resistant properties for use in the handling of petroleum products. The invention relates to a structural component, e.g., a piping system, having the combined properties of composites, corrosion resistant materials, and thermal protective coatings for use in oil and gas applications.

SUMMARY OF THE INVENTION

In one aspect, the invention relates to a method for joining pipe sections in a pipe system for containing corrosive petroleum products, the method comprising positioning two separate pipe sections adjacent to one another, with each pipe section comprising a structural layer comprising a composite material and a corrosion resistant layer for contacting the corrosive petroleum product, and a fire resistive layer; applying energy to join the corrosion resistant layers of the first and second pipe sections together forming a joint; applying an external wrap around the joint of the first and second pipe sections; and bonding the external wrap to the joint and the composite structural layers by at least one of chemical curing and thermal treatment.

In another aspect, the invention relates to yet another method for joining pipe sections in a pipe system for containing corrosive petroleum products. The method comprising: applying energy at the edge of the corrosive layers of two separate pipe sections together forming a joint; applying an external wrap around the joint; bonding the external wrap to the joint and the composite structural layers by at least one of chemical curing and thermal treatment; and applying a sufficient amount of fire resistive material onto the external wrap and the structural layers of the pipes for the pipe system to meet level II fire endurance standard according to IMO A 18/Res.753 fire testing protocol.

DETAILED DESCRIPTION

Figures 1, 2:
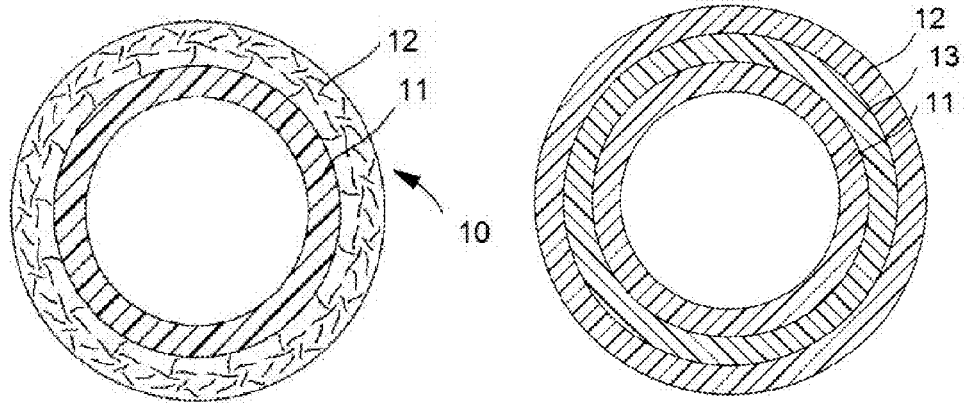
FIG. 1 is a side view in cross-section of an embodiment of a structural component, comprising a composite layer and an outer intumescent coating layer.
FIG. 2 is a side view in cross-section of a second embodiment of a structural component having a plurality of layers, a composite layer, an intermediate ceramic layer, and an intumescent coating layer.

The following terms will be used throughout the specification and will have the following meanings unless otherwise indicated.

As used herein, the term "petroleum products" refer to natural gas; natural and synthetic liquid hydrocarbon products including but not limited to biodegraded oils, crude oils, refined products including gasoline, other fuels, and solvents; and semi-solid/solid hydrocarbon products including but not limited to tar sand, bitumen, etc.

As used herein, the term "structural components" refer to pipelines, tubing, vessels, reactors, processing equipment including but not limited to distillation columns, heat exchangers, and the like for use in the oil & gas and petrochemical industry. In one embodiment, the structural component is for containing petroleum products.

As used herein, the term "structural layer" refers to a layer that creates or provides the structural support for a structural component.

As used herein, the term "corrosion resistant layer" refers to the layer of the structural component that is in contact with the petroleum product. The corrosion layer serves to decrease and/or mitigate general corrosion and erosion corrosion by the petroleum product contained within.

As used herein, the term "fire resistive layer" or "fire resistant layer" refers to the layer that protects the structural component for a specified period of time in the event of a fire.

As used herein, the term "contain" (or containing, or containment) means being used in an environment wherein petroleum products are employed or in contact with petroleum products, which includes the transport, processing, handling, storage, shipping, and containment of petroleum products, whether on a continuous, incidental, or intermittent basis.

As used herein, "thickness" refers to the average thickness of a layer of a material across the surface of the substrate on which the material is applied.

As used herein, the term "ceramic" refers to a material that comprises a ceramic material, or has properties of a ceramic material, e.g., an aluminide with properties similar both a ceramic and a metal.

As used herein, a "composite" material refers to an engineered material made from two or more constituent materials with different physical or chemical properties and which remain separate and distinct on a macroscopic level within the finished structure. In one embodiment, the composite layer comprises a fiber material in a matrix, e.g., a fiber-reinforced ceramic matrix composite material, or a metal matrix composite with a reinforcing fiber in a metal matrix, or a glass fiber material in a glass ceramic composite, etc.

As used herein, the term "amorphous metal" refers to a metallic material with disordered atomic scale structure. The term can sometimes be used interchangeably with "metallic glass," or "glassy metal," or "bulk metallic glass" for amorphous metals having amorphous structure in thick layers of over 1 mm.

As used herein, the term "intumescent" or "intumescents" refers to materials that undergo a thermal degradation upon exposure to elevated temperatures, which produces a thermally stable, foamed, multi-cellular residue called "intumescent char."

As used herein, "fusion welding" or "fusion bonded," or "fusion joined," refers to a method for joining separate sections of a structural component such as pipe sections together without the need to mechanically joining them (as in the prior art) such bolting flanged sections together.

As used here, the term "corrosive petroleum products" refers to applications in corrosive or material degradation environments in the oil & gas industry, or the containment of corrosive materials, including but are not limited to: hydrocarbons containing sulfur, sulfurous, hydrogen sulfide, sulfuric, hydrofluoric or hydrochloric or organic (such as acetic, formic, and high molecular weight organics), carbon dioxide vapors and condensation, carbonates and bicarbonates, ammonia, amines, imidiazoles and their salts and derivatives, and chloride and fluoride salts and acids; highly acidic to highly alkaline solutions in oil & gas environment; water containing these species at both acidic and alkaline ranges and in the various forms such as $H_2S$ (sour water) in oil & gas environment; hydrocarbons including crude oils of both low and high API gravity; processed or refined oils such as naphthas, gas oils, residuums and transportation fuels (such as gasoline, diesel, jet fuels).

In one embodiment, the structural component is characterized as having a multi-layered structure with the innermost layer comprises a material providing corrosion, abrasion, and/or erosion protection, and the outermost layer comprises a fire resistive layer, e.g., an intumescent material for its ability to withstand a hydrocarbon fire for a limited amount of time. The corrosion resistant layer comprises at least a material selected from the group of thermoplastic materials, ceramic materials, cermets, amorphous metals, and bulk metallic glass/metal composites. The structural layer comprises a composite material. The fire resistive layer comprises at least one of an intumescent coating layer, an insulation layer, or combinations thereof.

Structural Layer:

In one embodiment, the structural layer comprises a composite material. The composite layer is used as a substrate or supporting layer for other additional layers including the fire resistive layer and/or the corrosion resistant layer.

The thickness of the composite layer varies depending on a number of factors, including but not limited to: a) the application type, e.g., process/transfer piping, vessels, heat exchanger systems, internals in vessels such as distillation trays, etc.; b) the size of the structural component, a 12" or 48" nominal diameter pipe, a vessel of 8 ft. in diameter, etc.; c) the operating environment, e.g., internal burst pressure, etc.; and d) the location on the structural component, e.g., the joint may be thicker than the wall. For example, the composite layer may have a thickness of 7 mm for a 25 cm nominal diameter pipe vs. a thickness of 3-5" for a pipe having a 48" diameter.

The composite layer can be formed of one or more plies, with each ply having one or more fibers disposed within a matrix, such as a polymer, resin, a ceramic material, or thermoplastic. The composite layer can be formed of one or more layers of composite materials, wherein the layers can be of the same or different composite materials.

In one embodiment, the matrix material of the composite layer is a resin material selected from the group of phenolic resins and epoxy resins. In another embodiment, the matrix material is a specialty chemical with excellent fire resistant characteristics, selected from the group of cyanate ester, phenolic/polyester blend, silicone and phthalonitrile. In a third embodiment, the resin matrix is a material selected from siloxane-modified phenolic resins, furan resins, and mixtures thereof. In a fourth embodiment, the resin material is vinyl ester.

In one embodiment, carbon black can be added to the resin material for the composite layer to have a resistivity in the order of $10^8$ ohms/cm. The carbon black additive helps provide a static discharge that can advantageously prevent the ignition of flammable petroleum products contained within the structural component. In another embodiment, fire retardant additives, e.g., alumina tri-hydrate ("ATH"), commercially non-brominated fire-retardant additives such as Avtec's TSWB can be employed to improve the fire resistance properties of the composite layer.

The fiber material and orientation in the composite layer (or layers) can be selected to provide the desired mechanical characteristics for the structural component. In one embodiment, the structural composite layer comprises about 55 to 85 wt. % reinforcing fiber, based on the total weight of the composite. Materials suitable for use as the reinforcing fiber for the structural component include but are not limited to glass, carbon, ceramic material, polymeric materials, metals and metal alloys. Examples include but are not limited to carbon, glass, polyamide, polyester, beryllium, beryllium carbide, beryllium oxide, steel, quartz, tantalum, titanium, aluminum oxide, aluminum silica, aluminum, tungsten, tungsten carbide, etc.

In one embodiment, the composite material is a metal fiber-reinforced composite, in a metallic matrix, with the fiber consisting of an austenitic or precipitation hardened stainless steel or a nickel-based alloy. Likewise, a metal alloy can be used, with the metal alloy having a strength which is greater than that of the composite material and which is not permanently damaged by a thermo-mechanical treatment at temperatures of up to 600° C. The fibers may, for example, be Ti, TiAl, FeAl, NiAl or Co wires. This metal fiber-reinforced composite material comprises metal layers (as the matrix) and reinforcing metallic layers being disposed alternately in a sandwich structure. The metallic fibers are placed in the form of a loose structure between the metal layers, with the sandwich structure being bonded by a thermo-mechanical process.

In one embodiment, the reinforcing fibers comprise structural fibers and/or flexible yarn. The structural fibers may be formed of carbon, nylon, polyester, aramid, thermoplastic, glass, Kevlar fibers, or other suitable fiber materials. In one embodiment, the reinforcing fibers comprise flexible yarn (braiding fibers) formed of nylon, polyester, aramide, thermoplastic, glass, or other suitable fiber materials. In one embodiment, the composite material is a filament wound glass reinforced vinyl ester.

In one embodiment, the composite material comprises a ceramic material as the reinforcing fibers. In one embodiment, the ceramic fiber comprises a material selected from the group of amorphous boron, boron carbide, boron nitride, amorphous carbon, diamond like carbon (DLC), metal borides, carbides, nitrides, oxides, refractory metals, silicides, silicon carbide, sulfides, tungsten and tungsten carbide, and mixtures thereof. In one embodiment, the composite material comprises silicon and boron and silicon carbide fibers in a titanium alloy matrix.

In one embodiment, the composite material is a continuous fiber ceramic composite (CFCC) with a commercially available ceramic fiber such as Nicalon™ and/or Nextel™ fiber in a ceramic matrix. In another embodiment, the composite material comprises a ceramic fiber in a glass-ceramic matrix, e.g., a lithium aluminosilicate composite. In yet another embodiment, the composite material comprises a ceramic fiber in an epoxy matrix, e.g., filaments of high modulus polycrystalline alumina ceramic fiber in an epoxy resin.

In one embodiment, the reinforcing fibers in the composite layer can be woven, braided, knitted, stitched, circumferentially wound, or helically wound. In one embodiment, the fibers can be biaxially or triaxially braided. The composite layer can be formed through pultrusion processes, braiding processes, or continuous filament winding processes. In yet another embodiment, the fiber can be incorporated into the matrix forming the composite by any of the methods: resin infusion, pultrusion, filament winding, and resin transfer molding.

In one embodiment where the composite layer comprises a thermoset matrix, the matrix has a glass transition temperature of at least 180° F. (82° C.). In the case where a thermoplastic matrix is employed, the matrix has a melt temperature of at least 250° F. (121° C.).

In one embodiment, the composite material further comprises at least a flame retardant additive allowing the composite to have an effective degree of flame retardancy. In one embodiment, the composite material has an ASTM E-1345 ignitability of greater than 150 seconds when the composite is exposed to a radiant heat source of about 50 kW/m$^2$.

In one embodiment, the composite material has an interlaminar shear strength ranging from 50-90 MPa, and flexural strength ranging from 750 to 1500 MPa in one embodiment, and 800 to 1300 MPa in another embodiment. In one embodiment, the composite layer has an axial modulus of elasticity exceeding 100,000 psi (689 MPa) for applications in which the component may be subject to high internal pressure. In one embodiment, the composite layer has a tensile modulus of at least 100,000 psi (689 MPa). In another embodiment, the layer has a tensile modulus of at least 250,000 psi (1724 MPa).

In one embodiment of a structural component comprising a +/−55 degree filament wound glass reinforced vinyl ester, the composite layer is characterized with an axial flexural and tensile modulus of about $1.14*10^6$ psi, a hoop flexural and tensile modulus of $1.89*10^6$ psi, a shear module of $1.16*10^6$ psi, and axial coefficient of linear thermal expansion (CLTE) of $19.94*10^{-6}$ in/in/T. The laminated joints are characterized with an axial flexural and tensile modulus of about $1.5*10^6$ psi, a hoop flexural and tensile modulus of $1.5*10^6$ psi, and CLTE of $12*10^{-6}$ in/in/° F. A comparable flexural and tensile modulus for a vinyl ester resin without any glass reinforcement is $5.1*10^5$ psi.

Corrosion Resistant Layer:

The structural component comprises at least a corrosion resistant layer in contact with the petroleum product contained within. The corrosion resistant layer comprises at least one of thermoplastics, amorphous metals, ceramic materials, or combinations thereof. In one embodiment, the corrosion resistant layer is disposed directly onto the structural composite layer.

In one embodiment, a plurality of vent holes are provided in-between the corrosion resistant layer and the structural composite layer, helping to release any pressure that may be trapped in between the layers. In another embodiment, the plurality of vent holes are provided in the structural layer for the release of built-up pressure.

Depending on the material employed, the corrosion resistant layer thickness varies. When a thermoplastic is used as a corrosion resistant layer, the layer has a thickness ranging from 0.5 to 25 mm in one embodiment; from 1 to 15 mm in a second embodiment; and from 2 to 10 mm in a third embodiment. When a ceramic material is used as a corrosion resistant layer, the layer has a thickness ranging from 0.01 to 10 mm in one embodiment; from 0.015 to 5 mm in a second embodiment; from 0.75 to 3 mm in a third embodiment; and from 0.1 to 2 mm in a fourth embodiment. When an amorphous metal is used, the corrosion resistant layer has a thickness ranging from 0.010 to 5 mm in one embodiment; from 0.015 to 3 mm in a second embodiment; from 0.75 to 2 mm in a third embodiment; and from 0.5 to 1 mm in a fourth embodiment.

Thermoplastic Liner as Corrosion Resistant Layer:

In one embodiment, the structural component comprises at least a thermoplastic liner (layer) as the inner coating layer in contact with the petroleum product, for corrosion/erosion protection from the petroleum product contained within. The thermoplastic liner in one embodiment is bonded directly on the composite layer. The thermoplastic liner can be formed from any suitable thermoplastic material, including but not limited to for example, polyvinyl chloride, polypropylene, high density polyethylene, polyvinylidene fluoride (Kynar™), ethylene-chlorotrifluoro-ethylene (Halar™), polytetrafluoroethylene (Teflon™), polyphenylene sulfide (PPS or Ryton™) perfluoroalkoxy fluorocarbon, ionomer and terionomer (Surlyn™) compositions, and thermoplastic elastomeric rubber. The thermoplastic liner in one embodiment can include a glass mat backing. In another embodiment, it can be chemically treated or etched to improve adhesion to the structural layer. In one embodiment, the thermoplastic material is polytetrafluoroethylene. In another embodiment, the material is polyphenylene sulfide.

In one embodiment, the corrosion resistant layer comprises a plurality of thermoplastic liners, the liners are of the same or different materials. In one embodiment, an adhesive may be applied to the multiple corrosion resistant layers prior to the application of the exterior structural composite layer and/or an adhesive may be applied to the structural composite layer after its application to the corrosion resistant liner. In another embodiment, the exterior surface of the corrosion resistant layer may be heated to enhance the adhesion and/or embedding of the layer into the structural composite layer.

In one embodiment for a corrosion resistant layer comprising PPS, the liner is characterized as having a tensile modulus of 500,000 psi, a flexural modulus of 575,000 psi, and CTLE of $28*10^{-6}$ in/in/° F. at a temperature below 185° F. and $64*10^{-6}$ in/in/° F. at a temperature above 185° F. For a comparative corrosion resistant layer comprising perfluoroalkoxy fluorocarbon, the tensile modulus ranges from 39,000 to 51,000 psi; the flexural modulus ranges from 90,000 to 97,000 psi, and the CTLE is about $77.8*10^{-6}$ in/in/° F.

Ceramic Layer as Corrosion Resistant Layer:

In one embodiment, the structural component comprises at least a ceramic layer as the corrosion resistant layer. In one embodiment, the ceramic layer is the corrosion layer in contact with the corrosive material contained within. In another embodiment, the ceramic layer is disposed between the composite layer and a metal foil layer which is in direct contact with the corrosive material.

In one embodiment of a corrosive as well as erosive application, e.g., in a fluid catalytic cracking unit (FCCU), the ceramic layer is employed as the coating layer in contact with the petroleum product. Under FCUU service conditions, the structural component is exposed to aggressive petroleum fluids as well as hard solid particles such as catalyst particles. In one embodiment wherein the structural component is employed in aggressive oil & gas exploration applications, and wherein the structural component is exposed to abrasive materials such as sand, the ceramic layer is employed as the corrosion coating layer in contact with hydrocarbon products.

In one embodiment, the ceramic layer comprises at least a metal oxide, e.g., titania ($TiO_2$), zirconia ($ZrO_2$), tantala ($Ta_2O_5$), alumina ($Al_2O_3$), hafnia ($HFO_2$), ceria ($CeO_2$), phase-stabilized zirconias such as yttria-stabilized zirconias, calcia-stabilized zirconias, scandia-stabilized zirconias, magnesia-stabilized zirconias, zirconias stabilized by any rare earth oxide, or similar oxides, or combinations thereof such as yttrium oxides blended with zirconia. In one embodiment, the ceramic layer is first applied as a metallic layer, i.e., Ti, Zr, Ta, Al, Hf, Ce, etc., to be eventually oxidized. In yet another embodiment, the ceramic layer comprises at least one of a metal carbide such as silicon carbide, aluminum carbide, boron carbide, and zirconium carbide; a metal nitride such as silicon nitride, boron nitride, and aluminum nitride; a metal silicate such as aluminum silicate, cordierite, zircon, and steatite; and a metal boride such as silicon tetraboride, tungsten boride, and zirconium boride.

In one embodiment, the ceramic layer comprises a cermet material, i.e., a ceramic-metal composite with a ceramic phase and a metal binder phase. Cermets are generally more erosion resistant than refractory materials known in the art. The ceramic phase in one embodiment is a carbide, boride, carbonitride, oxide, nitride ceramic or a mixture of these ceramics. The metal phase in one embodiment is metal selected from the group consisting of cobalt, nickel, iron, molybdenum, titanium, zirconium, aluminum, and mixtures thereof. In one embodiment, the ceramic layer comprises chromium nitride, or nanocrystalline metal carbide/amorphous hydrocarbon composite (MC/aC:H). In another embodiment, the ceramic layer comprises TiC/amorphous hydrocarbon nanocomposite. In yet another embodiment, the ceramic layer comprises a chromium carbide or chromium oxide-nickel chromium coating.

In one embodiment, the ceramic layer includes about 30 to 95 vol. % of a ceramic phase, and a metal binder phase. In one embodiment, the metal binder phase comprises at least 30 wt. % of a metal selected from the group consisting of Fe, Ni, Co, Mn and mixtures thereof, and at least an element selected from the group of Cr, Al, Si, and Y.

In one embodiment, the ceramic layer comprises at least one of nickel aluminide, iron aluminide, tantalum aluminide, titanium aluminide such as gamma Ti-aluminide, or mixtures thereof. In yet another embodiment, the layer comprises an iron aluminide-ceramic composite with excellent oxidation and sulfidation resistance. In another embodiment, the layer is a silicon modified diffusion aluminide layer with a concentration of silicon at a surface in the range of about 1 to 10 wt. %. In another embodiment, the layer comprises a silicon-modified aluminide or yttrium-modified aluminide, applied as a thin coating layer of 10 to 100 μm thick. In yet another embodiment, the ceramic layer is a platinum modified aluminide coating with excellent hot corrosion resistance at temperature up to 900° C.

In one embodiment, the ceramic material further includes refractory fillers as particles or fibers, or both. The fillers in one embodiment comprise any of glass, graphite, or ceramic fibers and particles (granules). In another embodiment, the ceramic layer is a fire resistant material comprising 10-25 wt. % sodium silicate, 15-30 wt. % water, 12-25 wt. % clay, and 15- to 35 wt. % mica.

In one embodiment and in addition to the ceramic coating, an additional meal foil is employed to provide the composite layer with a duplex or dual-component coating to further provide the structural component with both wear resistance and corrosion resistance properties. In one embodiment, the additional coating is a thin (e.g., less than about 3 μm) layer of a metal or metal alloy, e.g., Ni or a Ni alloy layer, which is applied on top of the ceramic coating layer, e.g., a layer of chromium nitride or MC/aC:H. In one embodiment, the composite layer is surface treated by processes known in the art, e.g., ion implantation such as plasma nitriding, plasma immersion ion implantation or classical ion implantation, etc. to provide it with the additional coating layer.

In one embodiment, the ceramic layer is applied directly on the composite layer as a coating layer. In another embodiment, the ceramic layer is sandwiched between the composite layer and another layer, e.g., a thermoplastic corrosion resistant liner, a metallic sheeting layer or an intumescent coating layer. In an embodiment with the thermoplastic material as the corrosion resistant layer in contact with the petroleum product, the ceramic layer serves as an insulative coating layer, allowing the underlying composite layer to withstand higher temperatures and/or longer period of time before breaking down from fire and/or heat.

In one embodiment, the ceramic layer also serves as a permeation layer, operating to inhibit/mitigate the permeation of fluids into inner layers of the structural component. In one embodiment, the ceramic layer has a permeability of less than 0.01 cm$^3$/cm per sec-cm$^2$-bar.

In one embodiment, the ceramic layer has a thickness ranging from 0.1 micron to less than 10 mm. In a second embodiment, the ceramic layer has a thickness in the range of from about 1 to about 200 mils (1 mil=0.001 inch). In another embodiment, the protective ceramic layer is an oxide layer with a thickness ranging from 0.1 to 5 microns. In a third embodiment, the ceramic layer has a thickness ranging from 0.5 mm to less than 5 mm. In a fourth embodiment, the ceramic layer is less than 2.5 mm. The thickness of the ceramic layer depends on a number of factors including but not limited to the coating process employed, the petroleum products being contained within and whether the ceramic layer is employed as an intermediate layer or a coating layer.

In one embodiment, the ceramic layer is characterized as having an excellent erosion and fracture toughness properties. In one embodiment, the ceramic layer has a HEAT erosion resistance index of at least 5.0, as measured according to the Hot Erosion/Attrition Testing method (HEAT), which is a measure of material performance when subjected to hot and abrasive particulate matter and as described in US Patent Publication No. US2008/0003125. The higher the HEAT erosion resistance index, the better the erosion resistance performance of the material. In this HEAT test, the index is determined by measuring the volume of test material lost in a given duration. The velocity range of the test simulator is 10 to 300 ft/sec (3.05 to 91.4 msec) which covers the velocity range in a fluid catalytic cracking unit (FCCU). The test temperature is variable and may be up to 1450° F. (788° C.). The test angle of impingement is from 1 to 90 degrees. The mass flux may range from 1.10 to 4.41 lbm/minute.

In one embodiment, the ceramic layer is applied onto the composite layer (or an adjacent layer, e.g., metallic foil or thermoplastic layer) via the use of chemical vapor deposition (CVD), thermal spray coating by plasma, high-velocity oxy-fuel (HVOF) spraying, or high-velocity air fuel (HVAF) spraying, wire arc, physical vapor deposition (PVD), RF (radio frequency) sputtering and electroplating, paint spraying, spray coating, dipping, applying with a brush or roller, powder coating, vapor deposition, or combinations of the above.

Amorphous Metal Layer as Corrosion Resistant Layer:

In one embodiment, the structural component comprises at least an amorphous metal layer as the inner coating layer in contact with the petroleum product, for corrosion/erosion protection from the petroleum product contained within. In one embodiment, the amorphous metal is applied directly on the composite layer as a coating layer. In another embodiment, the amorphous metal is coated onto a metallic sheeting layer deposited on the composite layer. In a third embodiment, the amorphous metal is coated onto a ceramic layer, which is layered next to the composite layer.

It should be appreciated that the amorphous coating layer may include structural associations or units that may be randomly packed within the alloy matrix, e.g., particles or nanoparticles having a size in any of 10 to 100 angstroms; 10 to 150 nm; and 15- to 1000 nm. Examples include nanocrystals with a diameter in the range of 1 to 100 nm.

In one embodiment, the thickness of the amorphous metal layer ranges from 0.1 to 500 μm. In a second embodiment, from 5 to 2,500 μm. In a third embodiment, the thickness ranges from 10 to 100 μm. In a fourth embodiment, less than 50 μm. In a fifth embodiment, from 20 to 100 μm. In a sixth embodiment, the amorphous layer has a thickness in the range of from about 0.5 to about 100 mils.

In one embodiment, the amorphous metal is a commercially available iron based alloys, e.g., Superhard Steel Alloys™. In another embodiment, the amorphous metal is a commercially available material sold under the trademark name VITROLOY (Ti, Zr, B, Ni based).

In one embodiment, the amorphous metal comprises at least 50% iron, optionally chromium, one or more elements selected from the group consisting of boron and phosphorous, one or both of molybdenum and tungsten; and at least one member of the group consisting of Ga, Ge, Au, Zr, Hf, Nb, Ta, La, Ce, Pr, Nd, Sm, Eu, Gd, Tb, Dy, Ho, Er, Tm, Yb, Lu, N, S, and O. In a third embodiment, the metallic glass comprises $(Fe_{0.8}Cr_{0.2})_{79}B_{17}W_2C_2$.

In another embodiment, the amorphous metal layer comprises amorphous metal oxides (a-$Me_{1-x}C_x$), amorphous metal carbides (a-$Me_{1-y}C_y$)), amorphous metal carbide-nitrides (a-Me(C, N))), or amorphous silicon nitrides (a-$Si_{1-z}N_z$), wherein x is from 0.3 to 0.7, y is from 0.25 to 0.9, z is from 0.3 to 0.8, and Me (metal) is mainly one of transition metals, such as Cr, Al, Ti, Zr, or other chemical elements, such as silicon (Si).

In another embodiment, the amorphous metal layer comprises a bulk solidifying amorphous alloy (BMG) having improved corrosion resistance properties as disclosed in US Patent Publication No. US2009/0014096, herein incorporated by reference in its entirety. In one embodiment, the layer comprises a Zr—Ti-based BMG that match the corrosion resistance properties of CoCrMo, having the molecular formula: $(Zr_aTi_b)_{1-z}(Be_cX_d)_z$ wherein X is an additive material selected from the group consisting of Y, Co, Fe, Cr, Mo, Mg, Al, Hf, Ta, Nb and V; z is from 20-50 at %; the sum of c and d is equal to z and c is at least around 25 at %; and elements having an electronegativity greater than 1.9 are present only in trace amounts.

In one embodiment, the amorphous metal layer is applied onto the adjacent layer by a thermal deposition or a spray coating technique. Examples of spray coating techniques include flame spraying, cold spray, plasma spraying, wire arc, detonation gun, cold spraying, and high velocity oxy fuel (HVOF). In one embodiment, thermal spray is applied with a molten or semi-molten metal being sprayed onto a support layer of the structural component. In another embodiment, a hard particle coating matrix system is applied onto the substrate layer of the structural component, e.g., a ceramic layer or a composite layer.

After the amorphous metal layer is applied as a coating layer, the coating in one embodiment is at least partially devitrified by a heat treating process. The devitrification may lead to the formation of nanoscale or near nanoscale sized crystalline grains.

In one embodiment, the amorphous metal layer is formed by forming a successive build up of multiple glass layers. In another embodiment, the amorphous metal layer is formed by different cycles of heating/cooling of metallic glass layers at predetermined temperatures and controlled rates, for the development of different microstructure and optimum corrosion resistance properties. In yet another embodiment, the amorphous metal layer is formed as a graded coating layer, with the graded coating being accomplished by shifted from one amorphous metal powder to another amorphous metal powder during cold or thermal spray operations. In a fourth embodiment, the graded layer may range from the metallic (or ceramic) material comprising the layer adjacent to the amorphous metal layer, to a first amorphous metal, to a second different amorphous metal with more alloying elements, etc. The gradient bonding results in a fused interface such that there is at least partial metallic bonding between the metallic material and the substrate.

In one embodiment, the amorphous metal layer has a hardness of at least about 5 GPa. In another embodiment, an amorphous coating layer comprising Superhard Steel Alloys™ has a hardness of at least about 9.2 GPa. In a third embodiment, a hardness of at least about 16 GPa. In one embodiment, the amorphous metal layer is bonded to the adjacent layer, e.g., a metallic layer, a ceramic layer or the composite structural layer, with a bond strength of at least 5,000 psi. In one embodiment, the amorphous metal layer has a corrosion rate in 6.5 N HCl at about 90° C. in the order of μm/year. In one embodiment, no corrosion was detected even with the amorphous layer being in contact with 12 M HCl solution for a week. In yet another embodiment, the amorphous layer shows no mass loss (below detection limit of ICP-M) in 0.6M NaCl (⅓ month).

Optional Crush Resistant Layer:

In one embodiment, the composite structural layer is coated onto a crush resistant layer, which layer comprises a material that would help increase the strength of the composite layer. In one embodiment, the layer provides crush or collapse resistance to the composite material. In one embodiment, the crush resistant layer may be bonded or unbonded to the composite inner layer. The crush resistant layer may comprise a layer or layers of thermoplastic, thermoset material, or metal material.

In one embodiment, the crush resistant layer is a metal layer (foil). In one embodiment, the metal is selected from the group of aluminum, aluminum alloys, steel, carbon steel, stainless steel and combinations thereof. In one embodiment, the sheet has an adhesive bonding layer disposed on the outer surface in contact with the composite material.

In one embodiment, the metal foil is wrapped around the composite layer during manufacturing of the composite layer, or co-formed in manufacturing. Alternatively, the metal foil can be applied onto the composite layer using coating processes such as deposition; thermal spray coating by plasma or HVOF spraying, HVAF spraying, or wire arc spraying; physical vapor deposition; RF sputtering; electroplating; powder coating, and combinations thereof. In yet another embodiment, the metal foil comprises a fusible metal having a low melt temperature that allows the metal to be applied in a liquid or semi-liquid state onto the composite layer (or the ceramic layer, or another intermediate layer).

Optional Energy Absorbing Layer:

In one embodiment, the structural component further comprises an energy absorbing layer disposed on the surface of the composite layer (on the surface away from the surface in contact with the petroleum product). In one embodiment, the energy absorbing layer has a thickness ranging from about 0.6 to 3 millimeters. The energy absorbing layer comprises materials capable of absorbing energy by phase transformation at a temperature below a degradation temperature of the structural wall, e.g., to produce a gas, below a degradation temperature of the composite layer. The gas formed by such phase transformation produces a thermally insulating air pocket within the composite structure.

In one embodiment, the energy absorbing layer comprises materials selected from polyethylene, hydrated calcium sulfate (gypsum), aluminum trihydroxide, and other hydrated or hydroxide containing compounds capable of vaporizing or producing a gas constituent below about 300° C. In one embodiment wherein polyethylene is used as the energy absorbing material, it can be applied onto the composite layer in sheet form, forming a desired number of layers or layer thickness. Where the energy absorbing material is other than polyethylene, it can be applied in sheet form, in spray form, or in the form of solid half sheets configured to fit over the composite layer.

Fire Resistive Layer:

The structural component further comprises a resistive layer for use as a passive fire protection as the outermost layer or an internal protective coating. The resistive layer is characterized with a low thermal conductivity to protect the equipment and its content in the event of a fire. One of the benefits of the fire resistive layer is its ability to absorb some of the thermal energy generated during a thermal event, e.g., a fire in the area adjacent to the structural component, preventing or delaying the exposure of the inner layers to thermal runaway that may cause a failure in the equipment. Equipment failure can have a catastrophic effect with the leakage of hydrocarbons as further fuel to a fire.

In one embodiment, the resistive layer has a thermal conductivity ranging from 0.03 to 0.20 W/m·K (at 70° C.). In a second embodiment, the layer has a thermal conductivity ranges from 0.04 to 0.08 W/m·K (at 70° C.). In a third embodiment with a resistive layer comprising an intumescent material that expands at elevated temperature, the resistivity layer has a thermal conductivity ranging from 0.1 to 0.4 W/m·° C. at a temperature range of 200 to 800° C. In a fourth embodiment with a resistive layer comprising an intumescent material, the thermal conductivity value of the layer ranges from 0.005 to 0.4 W/m° C. in a temperature range of room temperature to 800° C. (in thermal model under different fire conditions).

In one embodiment, the fire resistive layer is provided with a plurality of vent holes. During normal operation, the vent holes helps release excess heat that may be built up in the equipment. In one embodiment, a blower/fan may be hooked up to the vent holes for an active vent circulation.

Intumescent as Fire Resistive Layer:

In one embodiment, the fire resistive layer comprises an intumescent layer. In one embodiment, the intumescent layer expands approximately 15 to 30 times in volume when the material's activation temperature is reached (e.g., exposed to fire). In a thermal runaway incident (e.g., a fire), the intumescent layer absorbs the excess heat via an endothermal reaction. Once the activation temperature (or "start expansion temperature" or SET) is reached, the lawyer begins to swell or expand. As the intumescent layer swells, it provides an insulating barrier between a fire and the structural component. After expansion, the material generates a char or ash-like layer. In one embodiment, the non-combustible char layer prevents, or at least hinders, the passage of heat to the underlying composite layer substrate material.

In one embodiment, a reinforcement mesh is first applied to the structural system, e.g., the composite layer or an intermediate layer such as a metal sheet, before the application of the intumescent layer. The mesh helps the intumescent material to retain their insulating or char layer when exposed to the elevated temperatures of a fire. The mesh in one embodiment is a loosely woven material which may or may not be first saturated with the intumescent layer, then wrapped around the structural component. Alternately, the mesh can be first wrapped around the structural component, then the intumescent material is applied onto the mesh.

In one embodiment, the intumescent layer comprises fire-protection compounds intercalated between the lattice layers of an exfoliating and/or expandable inorganic material selected from the group of expandable graphite and expandable mica. In one embodiment, the expandable inorganic material is present in an amount ranging from 5 to 50 wt. % of the intumescent layer.

In one embodiment, the intumescent layer comprises expandable graphite intercalation compounds, which are produced by dispersing graphite particles in a solution, which contains an oxidizing agent and the guest compound, which is to be intercalated. In one embodiment, the oxidizing agent is selected from the group of nitric acid, potassium chlorate, chromic acid, potassium permanganate, hydrogen peroxide, phosphoric acid, polyphosphoric acid, and the like.

In one embodiment, the intumescent layer is a flexible layer suitable for pre-installation or post-installation to the structural component as disclosed in US Patent Publication No. US2004/0054035, comprising an aqueous dispersion of 20 to 70 wt. % of a film-forming polymer, 20 to 70 wt. % of a flame retardant composition, 1 to 10 wt. % of a glass or ceramic material having a mean particle size of 40 to 150 microns, 5 to 30 wt. % of expandable flake graphite, and optionally from 1 to 10 wt. % of a phosphorous based flame retardant wherein all wt. % add up to 100%.

Intumescent chemicals can be incorporated in a variety of coatings systems, including epoxy, urea formaldehyde, novolac, polyvinylidine dichloride, polyvinylchloride, poly-acrylonitrile, polyurea, organopolysiloxane, unsaturated polyester and copolymers thereof, polyurethane, latex, water-borne, and solvent-borne. In one embodiment, the intumescent coating comprises exfoliating graphite in a carrier material selected from acrylonitrile butadiene styrene (ABS), polyphthalamide (PPA), crystalline polymer, polystyrene, silicone rubber, rubber latexes, acrylic polymer or copolymer, metallocene polymer, polyethylene, polypropylene, polyethylene-polypropylene copolymer, acrylic polymer, polycarbonate and mixtures thereof. In one embodiment, the intumescent coating comprises 5 to 50 wt. % exfoliating graphite.

In one embodiment, the intumescent coating is a commercially available coating product, e.g., a water-based, epoxy-based, polyurethane-based, urea formaldehyde-based resin. Examples of commercially available intumescent coating materials include FX-100™ by Flame Seal Products, Inc. of Houston, Tex.; CKC-F-268™ by Hy-Tech Thermal Solutions, Inc. of Melbourne, Fla.; Pycotex™ by Interex International, Ltd. of Lancashire, United Kingdom; Pyroflex™ by MM Systems Corporation of Pendergrass, Ga.; Firesteel™ by Firetherm Intumescent and Insulation Supplies, Ltd. of Kent, United Kingdom; Firetex™ by Altex Coatings, Ltd. of Bay of Plenty, New Zealand; A/D Firefilm™ by AD Fire Protection Systems, Ltd. of Ontario, Canada; Taikalitt™ by Nippon Paint Company of Osaka, Japan; Thermo-lag™ by Carboline of St. Louis, Mo.; CHARTEK™ from the International Paint of Akzo Nobel; and Safecoat™ Products by Eagle Specialized Coatings and Protected Environments, a division of DW Pearce Enterprises, Ltd. of British Columbia, Canada, among others.

In one embodiment, the intumescent layer further comprises ceramic (or glass) hollow microspheres in an amount of 1 to 20 wt. %. In one embodiment, the microspheres have a mean particle size of 40 to 150 microns. In one embodiment, the microspheres are white in color. When incorporated into an epoxy (or similar polymer) resin binder to form a coating, the ceramic microspheres increase the capability of the coating to reflect infrared radiation so that far less heat is absorbed into the coating and the coating can withstand higher temperatures before beginning to break down, or intumesce. The microspheres also greatly increase the thermal insulation properties of the intumescent.

In one embodiment, the intumescent layer further comprises conductive materials to prevent charge build-up. In one embodiment, the conductive material is composed of larger conductive particles such as short fibers having a bulk diameter of 1/32" to 1/2" and a length of 1/32" to 1". In another embodiment, the conductive particles are in the form of fibers, flakes, spheres, etc., having a bulk diameter of 1/4" to 1/2" and a length from 1" to 4".

In one embodiment, the intumescent layer comprises a material with a start expansion temperature (SET) in the range of 150 to 200° C. The SET is the temperature at which the intumescent layer starts to expand due, e.g., as caused by a fire in the area adjacent to the structural component. In another embodiment, the layer comprises a material having a SET of at least 200° C. In a third embodiment, of at least 250° C. In a fourth embodiment, of at least about 300° C.

In one embodiment, the resistive layer comprising an intumescent material expands less than 25% upon reaching its SET point. In another embodiment, the expansion is less than 50%. In a third embodiment, the expansion is less than 100%.

In one embodiment, the fire resistive layer comprises at least two different layers of different material characteristics, with an outer layer having a higher heat capacity than an inner layer. In the event of a fire external to the structural component, the outer layer quickly absorbs excess thermal energy and helps prevent the formation of hot spots on the equipment. The outer layer having a higher SET delays thermal energy being transferred to the inner layer, providing resistance to the propagation of a thermal runaway to the inner intumescent layer and/or a resistive layer comprising a different material, e.g., calcium silicate.

The intumescent layer can be applied onto the structural component using means known in the art, which generates the desired coating thickness in one or more applications, including but not limited to plasma spraying, paint spraying, spray coating, dipping, applying with a brush or roller, powder coating, vapor deposition, knife-edge or doctor blade coating, or combinations of the above, followed by drying at room temperature or elevated temperature as dictated by the particular intumescent material, to form an adherent, durable coating. Non-planar surfaces may be coated by die-coating, spraying, brushing, dipping, or the like, and dried similarly. In one embodiment, the intumescent layer is in the form of a "wrap" which can be wrapped around (or taped onto) the substrate of the structural component until the substrate is covered with at least an intumescent layer.

In one embodiment with the use of intumescent as the fire resistive layer, the dry thickness of the intumescent layer ranges from 100 microns to 100 mm, depending on the level of fire protection required. In a second embodiment, the intumescent layer has a thickness from 0.5 to 5 mm. In a third embodiment, the intumescent layer has a thickness of 3 to 10 mm. In a fourth embodiment, the thickness is at least than 15 mm. In a fifth embodiment, the layer as a thickness of at least 50 mm. In a sixth embodiment, the thickness is less than 20 mm. The intumescent coating can be applied as a single layer or a plurality of layers. With solvent based or water based intumescent products, the higher dry film thicknesses can be achieved by the application of multiple coats. When used as a fire resistive layer, the thermal conductivity of intumescent coating varies at elevated temperature. In one study, it was shown that at the initial stage of heating, the effective thermal conductivity of the intumescent decreases until the surface and the inner layer, e.g., composite layer, are approximately constant, then the thermal conductivity converges to a constant value.

Insulation Material as Fire Resistive Layer:

In one embodiment, instead of or in addition to an intumescent coating, the structural component comprises an insulation material as a fire resistive layer. In one embodiment, the insulation layer is an internal fire resistive layer, further protected or coated with an intumescent layer as the outermost layer. In another embodiment, the insulation material serves as the only fire resistive layer. In yet another embodiment, the insulation layer is an externally applied thermal insulation system or outmost fire resistive layer.

In one embodiment, the fire resistive layer comprises an insulation layer having a thickness ranging from 1 to 10", a mesh wrapped about the insulation for holding the insulation in place, and an outer jacket (or weather barrier) for keeping the insulation dry. In another embodiment, the insulation layer is between 2 to 4" thick.

In one embodiment, the fire resistive layer comprises an insulation material selected from the group of calcium silicate (ASTM C 533 Type I or type II), cellular glass (ASTM C 552 Type I), expanded perlite (ASTM C 610), mineral wool (ASTM C 547 Class 3 or ASTM C 612 Type 4B Category 2), or mixtures thereof, embedded in a mesh layer. In one embodiment, the mesh layer comprises wire mesh. In another embodiment, the mesh layer comprises tie wires of 18 gauge (0.047 inch diameter) or 16 gauge (0.063 inch diameter) type, 304 stainless steel.

In one embodiment, the fire resistive layer is type I insulation material with a maximum use temperature of 1200° F. and a maximum density of either 14 lbs/ft$^3$ or 22 lbs/ft$^3$. In another embodiment, it is a type II material with a maximum use temperature of 1700° F. and a maximum density 22 lbs/ft$^3$. In one embodiment, the fire resistive layer is calcium silicate with a maximum linear shrinkage of 2% after exposure to a maximum use temperature, and a thermal conductivity ranging from 0.040 to 0.075 W/m·° K.

Optional Intermediate Containment Structure:

In one embodiment, the structural component further comprises a secondary containment structure bonded to the outer surface of the composite layer. In one embodiment, the containment structure comprises a multi-ply fabric covering the surface of the composite layer, with the multi-ply fabric having at a first layer bonded to the composite layer outer surface and at least a second layer comprising a coating of cured resin. In one embodiment, the cured resin is characterized as being resistant to chemically induced corrosion, impact, and abrasion.

Optional Outer Jacket:

In one embodiment, the fire resistive layer is further clad with ASTM A 240 type 304 or 316 stainless steel outer jacket of 0.01 to 0.125 inch thick. In one embodiment, the outer jacket is further laminated with 1 mil polyethylene moisture barrier. In another embodiment, the heat sealed moisture barrier is a 3 mil co-extrusion of Surlyn™ and polyethylene. All fittings, such as bands, rivets, screws, tees, end caps, etc., in one embodiment are made out of stainless steel material to further seal the insulation from moisture.

Optional Adhesive Layer:

In one embodiment, at least an optional adhesive layer is employed interposed between the various layers, e.g., between the composite layer and the fire resistive layer, between the composite layer and the crush resistant layer, e.g., a metal foil, or between the metal foil and the fire resistive layer, or between the metal foil and the ceramic layer, etc. Materials for the adhesive layer may include any polymers or other materials suitable for bonding, chemically, mechanically and/or otherwise. Suitable materials may include, for example, contact type adhesives or liquid resin type adhesives, metal coated polymers, filled polymers, thermoplastic elastomers, thermosets, thermoplastics, filled polymers, or combination thereof.

The adhesive layer is optional. In certain embodiments, an adhesive layer may not be necessary or desired. For example, in one embodiment with the use of a mesh for the application of the intumescent coating as the fire resistive layer, the adhesive layer may not be needed for the bonding of the intumescent coating.

Figures Illustrating Embodiments:

Reference will be made to the figures to further illustrate embodiments of the invention. The figures illustrate the invention by way of example and not by way of limitation, i.e., limiting the structural component to a pipe with a cross-section area as illustrated. The structural component can be of other configurations, e.g., vessels, etc. The structural component can also have different multiple layer arrangements not illustrated in the figures, e.g., having a composite layer surface treated with an erosion/corrosion coating and an intumescent layer with an external insulation layer.

With reference to FIG. 1 as shown, the structural component 10 is configured from two layers (with the innermost corrosion resistant layer not shown), a composite layer 11 for structural support and coated with an outer intumescent coating layer 12 for fire resistance properties. In FIG. 2, the structural component 10 further comprises a corrosion resistant layer, e.g., an amorphous metal layer, a thermoplastic liner or a ceramic layer 13, in addition to the composite layer 11 and the fire resistive layer 12. In one embodiment (not shown), the structural component further comprises an energy absorbing layer.

Figures 3, 4:
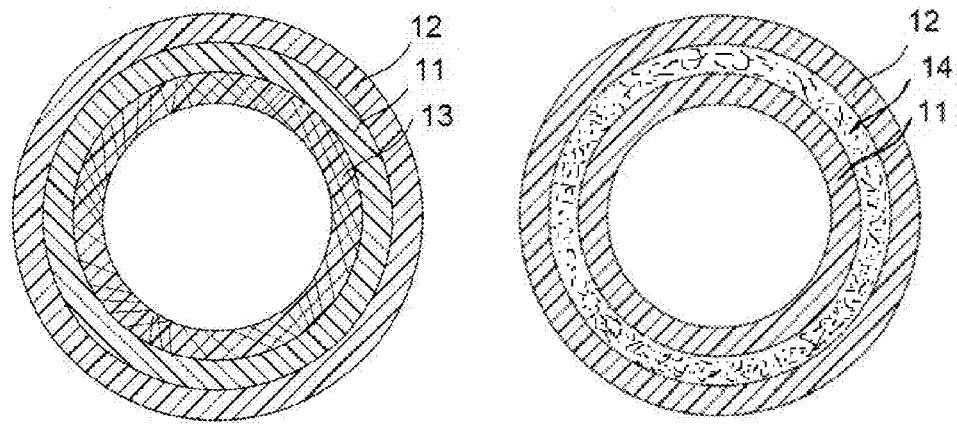
FIG. 3 is a side view in cross-section of a third embodiment of a structural component having a plurality of layers, an inner ceramic layer and/or an amorphous metal layer, an intermediate composite layer, and an outer intumescent coating.
FIG. 4 is a side view in cross-section of a fourth embodiment of a structural component having a plurality of layers, a composite layer, an intermediate metallic layer, and an outer intumescent coating.
Figure 5:
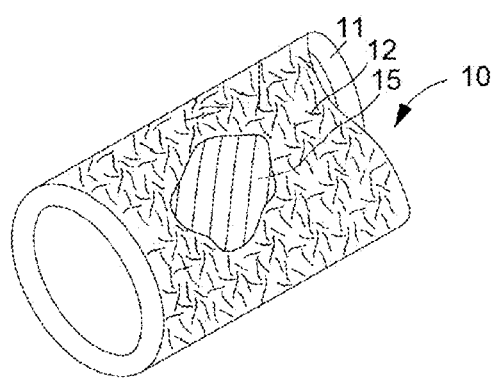
FIG. 5 is a side elevational view of an embodiment of a structural component, wherein a reinforcement mesh layer is employed before the application of the intumescent layer.

In FIG. 3, the innermost layer (in contact with the corrosive product) of the structural component is a ceramic layer 13, which is coated onto the composite layer 11. The fire resistive layer comprises an intumescent coating 12. In one embodiment (not shown), the inner most layer comprises an amorphous metal instead of, or in addition to the ceramic layer for corrosion/abrasion resistant. In FIG. 4, the structural component 10 multilayered structure consists of a composite layer 11 coated with a thermoplastic liner (not shown) as the layer in contact with the corrosive product, an intermediate metallic layer 14, and an outer intumescent coating 12. FIG. 5 is a side elevational view of an embodiment of a structural component 10, wherein a reinforcement mesh layer 15 is applied onto the composite layer 11 before the final coating of the intumescent layer 12.

Figure 6:
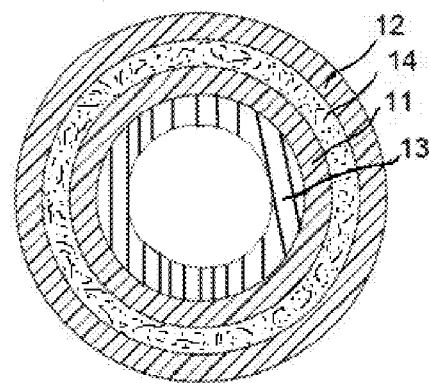
FIG. 6 is a side view in cross-section of a fifth embodiment of a structural component with a plurality of layers including an ceramic layer and/or an amorphous metal layer, a composite layer, a metallic layer, and an intumescent layer (applied onto a reinforcement mesh layer not shown).

In FIG. 6, the structural component 10 has multiple layers, a ceramic (or amorphous metal) corrosion resistant layer 13, a composite layer 11, a metallic layer 14, and an intumescent layer 12 which is applied directly onto the metallic layer 14. In one embodiment, there is a reinforcement mesh layer (not shown) between the metallic layer 14 and the composite layer 11, or between the metallic layer 14 and the intumescent layer 12.

Figure 7:
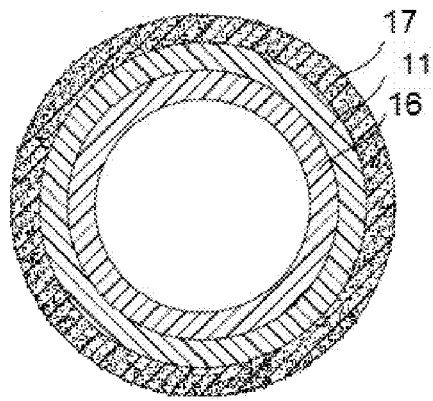
FIG. 7 is a side view in cross-section of a sixth embodiment of a structural component with a plurality of layers including a corrosion resistant thermoplastic liner, a composite layer, and a fire resistive insulation layer.

FIG. 7 illustrates the cross section of another embodiment of a structural component, e.g., a pipe section. The pipe has multiple layers including a thermoplastic corrosion resistant layer 16 in contact with the petroleum product contained within, a structural layer 11 comprising a composite material, and a fire resistive layer 17 comprising an insulation material. In one embodiment (not shown), the pipe section may further comprise a metallic coating layer, e.g., a stainless steel foil for containing the fire resistive layer 17.

Figure 8:
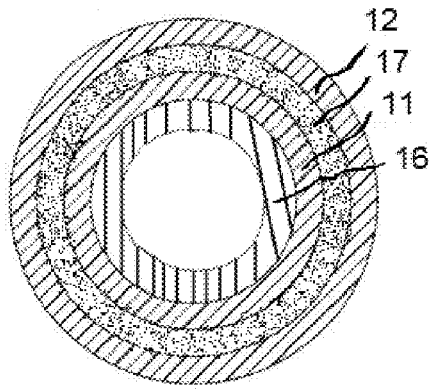
FIG. 8 is a side view in cross-section of a seventh embodiment of a structural component, with an intumescent layer applied as an additional fire-resistive coating onto the structural component of FIG. 7.

FIG. 8 is a variation of the embodiment illustrated in FIG. 7, wherein the pipe section is further provided with another and different fire resistive layer, e.g., an intumescent coating layer 12 for further fire protection.

Applications:

The multi-layered configuration is suitable for use as structural components containing corrosive petroleum products in oil and gas production, transportation, and processing applications. Examples of structural components include but not limited to petrochemical process equipment and pipelines, process vessels, transfer lines and process piping, heat exchangers, cyclones, and distillation columns. The structural components with the multi-layered configuration are characterized as having excellent corrosion/erosion properties, fire resistant properties, and being light and strong with a composite material for the structural support.

Oil production, transportation, and processing applications described herein include but are not limited to: oil and gas exploration processes, production processes including hydrocarbon extraction and oil/water/brine/gas separation, pipeline, shipping, trucking transportation of raw or finished hydrocarbon products, production and refining processing to include gas sweetening involving amine, carbonate, or other processes to remove carbon dioxide and/or hydrogen sulfide or other gases, crude oil distillation units, fluid catalytic cracking units, catalytic reforming units, thermal cracking units, hydroprocessing units, sulfuric or hydrofluoric alkylation units, isomerization units, sour water treating units, and supporting utility units such as cooling water, boiler water, and effluent treatment units.

In one embodiment, the multilayered structural component is suitable for use in containing corrosive petroleum products having sulfur (including elemental sulfur) level from a low ppm to a high percent level of $H_2S$ concentration. In one embodiment, $H_2S$ is of a low concentration in the range of 50 to 100 ppm. In another embodiment of applications involving sour gas, e.g., the $H_2S$ concentration is in the range of 20,000 ppm-50,000 ppm or more (2 to 5%).

In one embodiment, the component is for use with corrosive petroleum products having a Total Acid Number (TAN) in the range of at least 0.01 mg KOH/g. In one embodiment, the petroleum product has a TAN of at least 0.50 mg KOH/g. In another embodiment, the petroleum product has a TAN in the range of 0.50 to 10 mg KOH/g oil. TAN is typically measured by ASTM method D-664-01 and is expressed in units of milligrams KOH/gram of oil. Oils with TAN values below 0.5 are generally regarded as non-corrosive, between 0.5 and 1.0 as moderately corrosive, and corrosive above 3.0. In one embodiment, the structural components are for the containment of high TAN crude oil or high acid crude oil, with a high content of naphthenic acid, i.e., with a TAN higher of at least 3.

In one embodiment, the component is for use with corrosive petroleum products having a salt level of at least 3 lbs/bbl (barrel of crude oil). In one embodiment, the salts are chloride salts such as magnesium chloride, sodium chloride, and calcium chloride in amounts from about 3 to 200 pounds/bbl. In one embodiment, the structural component is for the containment or transport of petroleum such as catalytically reformed gasoline, a catalytically reformed gas or the like, having a high concentration of chlorides.

In one embodiment, the structural component is in the form of a process/transfer pipe with an internal diameter in the range of 12" to 18", for use under continuous operating temperature of at least 300° F. and internal pressure of at least 200 psi. In another embodiment, the structural component is in the form of a process/transfer pipe having a diameter of up to 48". In one embodiment, the multi-layered structural component further comprises an insulation layer of 2" to 10" thick, or as thick as required for a high temperature environment (above 500° F., and particularly in the range of 800° F. or above).

It should be noted that the structural component is not limited to carrying and/or containing corrosive petroleum products. In one embodiment, the structural component is employed as a corrosion resistant and fire resistant pipe system suitable for sprinkler systems and the like in off-shore petroleum platforms, oil tankers, etc., for containing large volume of sea water and with the fire hazards associated with a petrochemical environment.

In one embodiment wherein the surface of the structural component in contact with the petroleum product is coated with a ceramic layer, the structural component is particularly suitable for use in areas of fluid catalytic conversion units, fluid cokers, and flexicoking units of refinery and petrochemical units.

Process for Forming:

The various layers for the multi-layered structure can be applied pre-installation or at the job site.

In one embodiment of a pre-installation forming process with thermoplastics as a corrosion resistant layer, the liner is initially extruded in the desired shape or profile. The profile is then contacted with reinforcing fiber and resin to form the structural layer. Subsequent layers, e.g., fire resistive layer or layers can be subsequently formed or coated onto the structural layer using methods known in the art.

In one embodiment of post-installation, any coating method as previously discussed which generates a coating may also be applied over the pre-installation coatings, either to increase the coating thickness, or to repair damaged areas as a result of manipulation during installation.

In one embodiment, the structural component is constructed from an existing installation or already constructed equipment, e.g., an equipment constructed from composite materials with some corrosion/erosion resistant properties already. Protective/fire-resistant intumescent coating layers can be applied over the surfaces of the existing equipment to provide needed fire-resistant properties. In yet another embodiment, protective coatings can be applied over the inner surfaces (in contact with the petroleum product) of a structural component, so as to fill voids and pores and provide corrosion and/or erosion resistant protection to the surface in contact with the petroleum product.

Coating such as the ceramic layer, the amorphous coating layer, the intumescent layer, or the metal foil layer, can be applied on existing equipment using methods known in the art, including brushing, thermal spray coating, paint spraying, spray coating, dipping, applying with a brush or roller, or combinations thereof, providing a conformal surface treatment to the structural component.

In embodiments with the use of at least a metal foil layer, a wire mesh, or an amorphous coating layer, the structural component is sufficiently conductive. In other embodiments, e.g., a multi-layered structural component with a ceramic coating layer, a composite layer as the base substrate, and an intumescent coating layer, the structural component may not be sufficiently electrically conductive leading to electrostatic charge (ESC) build-up. In one embodiment to abate the charge build-up, a coating or layer or electrostatically dissipative (ESD) paint can be applied on top of the intumescent layer, with the paint providing a sufficiently high electrical conductivity while retaining the desired fire resistant properties. The high electrical conductivity dissipates the electric charge as it builds up, and eventually conducts the charge to ground.

In one embodiment of a process/transfer pipe with the use of a composite material as the structural layer and a plastic material such as polytetrafluoroethylene for the corrosion resistant layer, process pipe sections can be fused or joined together ("fusion welded" or "fusion welding").

In one embodiment, the thermoplastic corrosion liner is first conveniently fused or joined (or welded) using processes known in the art with the application of energy, including but not limited to laser welding, infrared welding; microwave welding, fusion welding, ultrasonic welding, friction welding, and the like.

Figure 9:
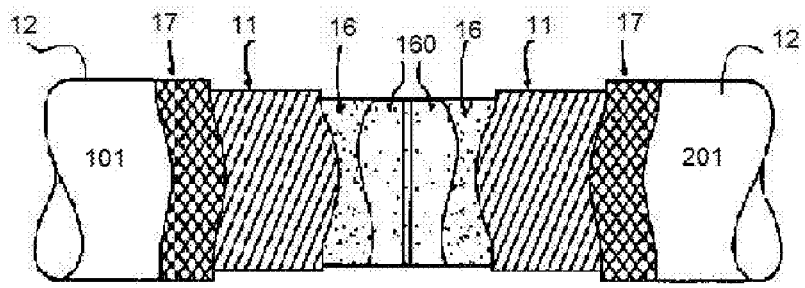
FIG. 9 is a side cut away plan view of an embodiment of a joint between two sections of pipe segments, with the corrosion resistant layers of the separate segments being fusion bonded.

FIG. 9 is a side cut away plan view of an embodiment for joining two sections of pipe segments, with the corrosion resistant layers 16 of the two pipe sections 101 and 201 being fusion bonded. The pipe segments each comprises an innermost corrosion resistant layer 16, a composite structural layer 11, a fire resistive layer 17, and an outmost metal foil layer 12.

In one embodiment, the first ends of two pipes 101 and 201 are cut back (having the composite layer removed) before being aligned and fused together at joint line 160. After the joining of the corrosion resistant layers of the separate pipe sections at the joint line 160, the structural layers 11 of the separate sections are joined next.

In one embodiment, after the thermoplastic corrosion liner ends are fused at the joint line 160, the cut back area is primed and wrapped circumferentially with a joint tape, fabric, or a fiber wrap. In one embodiment, the cut back area (exposing the corrosion resistant layers) is first heated prior to the wrapping of the joint tape. In another embodiment, the joint tape may be drawn through a resin bath prior to wrapping the joint area. In one embodiment, the joint tape is built up to a thickness of 1.10 to 2 times the thickness of the composite structural layer.

In one embodiment, a prepreg material can be wound on covering joint line area 160 and then chemically cured. In one embodiment, fiber in the form of a sleeve or wrap-around layers is employed to cover the joint section, then the fiber and resin are chemically joined together. In another embodiment, adhesive is used to chemically bond the fiber to the joint sections. In yet another embodiment, heat is also applied to accelerate and/or improve the chemical bonding between the fiber sleeve and the composite pipe sections.

Figure 10:
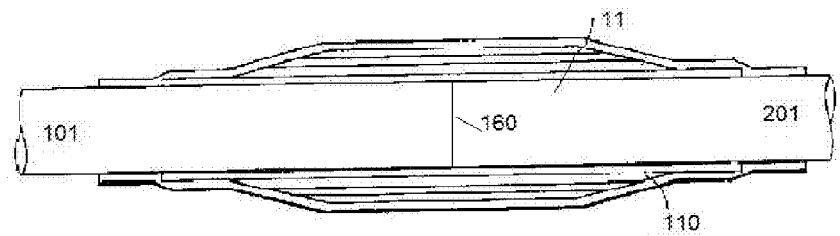
FIG. 10 is a schematic cross section of the outside of the joint of FIG. 9, with an external wrap joining the composite layers of the two pipe sections.

FIG. 10 is a schematic cross section of the outside of the joint 160 of FIG. 9, with an external glass fiber wrap 110 joining the composite layers of the two pipe sections. In one embodiment, the wrap 110 comprises a plurality of wraps wetted with a thermosetting resin and wrapped circumferentially relative to the pipes, with the wrap progressively tapers at the edges in the longitudinal direction of the pipes sections 101 and 201. Although not shown, a pipe system can also be built by first fusion bonding sections of composite pipes having corrosion resistant liners, then applying a layer of fire resistive material (and other layers or materials) onto the joint and the rest of the pipe segments to protect the system in the event of fire.

In one embodiment with the use of thermoplastic as the matrix for the composite layer, the fiber sleeve may be removed by melting if access to the interior of the pipe is subsequently needed. The application of heat in one embodiment also helps improve the adhesion of the thermoplastic corrosion layer to the woven glass fiber in the structural layer.

Properties of Structural Components:

In one embodiment, a structural component comprising multiple layers of at least a composite layer and an intumescent layer having a sufficient thickness for the structural component to attain at least 30% longer protection in jet fire testing procedure OTI 95634 than attained by a component comprising only a composite layer. In one embodiment, the structural component attains 50% longer protection. In a third embodiment, 100% longer protection. In the jet fire testing procedure OTI 95634 dated 1996, a 0.3 kg/s propane vapor sonic velocity impinges on a 1.5 m² target 1 meter away, for a temperature of about 1100° C. and heat flux of about 300 kW/m². The sufficient thickness depends on a number of factor, including the size of the structural component (e.g. diameter, dimensions, etc.), the thickness of the composite layer, the material of construction of the composite layer (e.g., glass, ceramic, thermoset matrix, etc.), the type of petroleum product contained within, etc. In one embodiment, the sufficient thickness is at least 10 mm thick. In another embodiment, at least 15 mm thick. In a third embodiment, at least 30 mm thick.

In one embodiment, a multi-layered structural component with at least a composite layer and an intumescent layer shows excellent fire tolerance and fire resistance properties, i.e., at least 5 minutes, in a burn-through test. In a second embodiment, the structural component has a burn-through time of greater than 15 minutes. In a third embodiment, a burn-through time of greater than 30 minutes. In a fourth embodiment, at least 45 minutes. In one embodiment, a multi-layered structural component with at least a composite layer and an intumescent layer with a thickness in the range of 0.5 to 2 cm has a fire resistance property of at least 15 minutes in a burn-through test.

In one embodiment, a multi-layered structural component with at least a composite layer and an intumescent layer demonstrates a burn-through tolerance equivalent to that of carbon steel having a thickness of at least 0.07" thick. In another embodiment, the multi-layered structural component demonstrates a burn-through tolerance equivalent to that of carbon steel having a thickness of at least 0.10" thick. In a third embodiment, burn-through tolerance equivalent to carbon steel of 0.15" thick.

In a burn-through test (based on the US Navy test MIL-STD-2031), a specimen sample is placed in front of a 500,000 BTU/hour propane fire. Temperatures of 1100° C. (about 2000° F.) are produced at the specimen surface via direct flame, e.g., as in a hydrocarbon fire. The sample is a section of 24" by 24" by ¼" thick. The unexposed side of the substrate is monitored for fire resistance and the time for the materials to burn through is measured.

In one embodiment, the multi-layered structural component in the form of a piping system is characterized as meeting level II fire endurance standard according to the test method specified in the International Maritime Association (IMO A753, adopted Nov. 4, 1993), i.e., the pipe can endure a fully developed a hydrocarbon fire for a long duration without loss of integrity under dry conditions. The duration meeting level II standard is a minimum of thirty minutes, at a forced temperature of about 1100° C. on the outside diameter, according to the test method specified in the International Maritime Association (IMO A753, adopted Nov. 4, 1993). The duration meeting level I standard is higher, with a minimum of an hour.

In one embodiment, it takes at least 45 minutes before the inside diameter of the pipe (an interior pipe surface) reaches 190° C. under the conditions of the IMO A753 test. In another embodiment, it takes at least an hour before the inside diameter of the pipe reaches 190° C. In another embodiment, it takes at least 1½ hours before the inside diameter of the pipe reaches 190° C.

In one embodiment, a multi-layered structural component with at least a composite layer and an intumescent layer shows excellent flexural strength—even after exposure to radiant heat flux. It is expected that a multi-layered structural component having at least a composite layer and a fire resistive layer to have a residual flexural strength of at least 2 times the flexural strength of a prior art structural component made out of composite layer materials, after exposure to a radiant heat flux of 25 kW/m² after 20 minutes (per ASTM D-790). In a second embodiment, the multi-layered structural component has a residual flexural strength of at least 3 times the flexural strength of a prior art composite component (without a fire resistive layer) after exposure to radiant heat.

In one embodiment wherein the structural component is a process/transfer pipe, the structural component has a nominal diameter ranging from 203 mm to 1016 mm (8" to 40"), with a working pressure rating up to 10,000 psi and a burst pressure of 2.5 times the working pressure. In one embodiment, the burst pressure ranges from 827 to 1034 bar (12,000 to 15,000 psi). In one embodiment, the pipe has a linear bend strain of 2 to 5%. In another embodiment, the structural component in the form of a process pipe has a maximum linear bend strain of 3%.

In one embodiment, a piping system employing a thermoplastic corrosion liner requires at least 20% less maintenance than a similar piping system employing carbon steel in the prior art with bolted flanges (when used for containing petroleum products). This is due to the fact that minimum if any bolted flanges are required to join sections. The composite is a more compatible material for the thermoplastic material layer, particularly in operations at high temperature and/or frequent thermal cycling. Composite materials, i.e., fiber reinforced plastic or FRP, have a much lower flexural modulus compared to that of carbon steel. Depending on the amount of carbon, carbon steel in one embodiment has a flexural modulus of 189-210 GPa or 27,000,000 to 30,000,000 psi. Composite materials have a flexural modulus of about $1/10^{th}$ to $1/30^{th}$ that of metallic materials, typically ranging from 1,000,000 to 2,000,000 psi. In one embodiment, the flexural modulus ranges from 75,000 to 2,000,000 psi. In a third embodiment, the flexural modulus ranges from 500,000 to 1,500,000 psi. In a fourth embodiment with a composite comprising carbon epoxy and/or boron epoxy, the flexural modulus can be substantially higher, but still much less than carbon steel with a flexural modulus of less than 9,000,000 psi. In one embodiment with the use of carbon epoxy, the composite has a flexural modulus of about 54 GPa (7,800,000 psi).

Depending on the selected thermoplastic material, in one embodiment the corrosion resistant layer has a flexural modulus ranging from 75,000 to 1,000,000 psi (for a composite/thermoplastic flexural modulus ratio of 1:1 to 26:1). In another embodiment, the flexural modulus of the corrosion resistant layer ranges from 90,000 to 750,000 psi. In a third embodiment, the flexural modulus of the corrosion liner ranges from 100,000 to 600,000 psi. With a lower flexural modulus, deformation recovery is possible for the structural component under impact, as opposed to structural components employing carbon steel in the prior art, which can be permanently deformed.

Besides the compatibility in the flexural modulus, composite materials are also a better match in terms of thermal expansion for thermoplastic materials used as the corrosion resistant layer in contact with petroleum products. The coefficient of thermal expansion for composite materials is higher than that of carbon steels. The rate of thermal expansion in the composite layer depends on the amount of fiber in the layer and the orientation of the fiber. In one embodiment, the composite layer has a CTLE ranging from 0.9 to $2*10^{-5}$ in/in/° F. This is in comparison to carbon steel with a CTLE of 0.6 to $0.65 \times 10^{-5}$ in/in/° F. PTFE which is a commonly used material for the corrosion resistant layer has a CTLE of $7.5*10^{-6}$ in/in/° F.

With the use of composite materials for the structural layer, the structural component in one embodiment is characterized with a pressure expansion that is at least 10 times greater than carbon steels in one embodiment, 20 times greater in a second embodiment, and up to 25 times greater than a structural component employing carbon steel.

With respect to the thermal conductivity, a structural component employing composite materials as the structural layer is characterized with an overall lower thermal conductivity, which is particularly suitable in situations with thermal runaway or hot spots. This is due to the much lower thermal conductivity of the composite layer. In one embodiment, the thermal conductivity of the composite layer is 100-300 times less than the thermal conductivity of carbon steel. The thermal conductivity of the composite layer in one embodiment ranges from 0.1 to 0.24 BTU-ft/hr-ft$^2$-° F., compared to the thermal conductivity of carbon steels of 25-50 BTU-ft/hr-ft$^2$-° F., and 1.70 BTU-ft/hr-ft$^2$-° F. for PTFE, a typical thermoplastic material that can be used for the corrosion resistant layer.

Lastly, in one embodiment, the structural component is characterized as having excellent fire endurance properties due to the high melting point of the composite materials used as the structural layer. In one embodiment, the composite layer has a melting point of well above 2900° F., with the ability to withstand a hydrocarbon fire at temperatures of up to 1800° F. for 30 minutes. Carbon steels typically have a melting point in the range of 2600 to 2800° F.

EXAMPLES

The following illustrative examples are intended to be non-limiting.

Embodiments of structural components, e.g., pipes, were modeled using finite element analysis (FEA) or predictive models. The predictive model used was a general purpose professional package from Solidworks. The modeled pipes are 8" ID pipes, comprising glass reinforced epoxy thermoset for the structural composite layer, thermoplastics materials for the corrosion resistant layer, and a fire resistive layer comprising calcium silicate. In the thermal modeling, the corrosion resistant layer is not taken into account as the thermal data is insignificant compared to the thermal data of the structural layer and the fire resistive layer.

Figure 11:
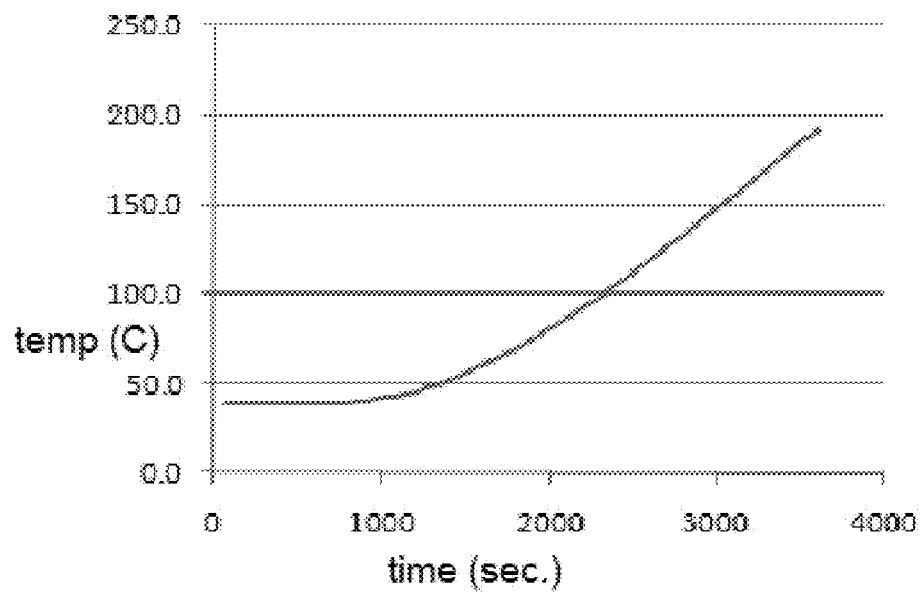
FIG. 11 is a graph plotting the change in temperature of the inside of a pipe as a function of time with a forced temperature on the outside diameter.

In example 1, the 8" ID pipe has a structural layer with a thickness of 0.43" and a fire resistive layer comprising calcium silicate of 2" thick. FIG. 11 depicts the temperature of the inside of the pipe (ID) as a function of time with a forced temperature of about 1100° C. on the outside diameter, according to the test method specified in the International Maritime Association (IMO A753, adopted Nov. 4, 1993). The inside diameter of the pipe reaches 191° C. after an hour.

Figure 12:
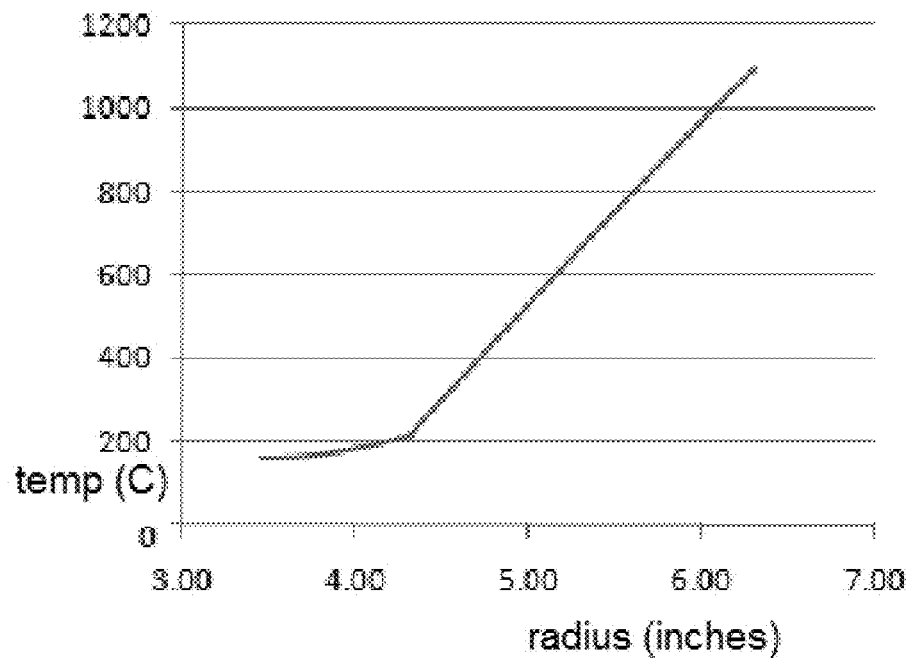
FIG. 12 is a graph showing the change in temperature of another pipe after exposure to a forced temperature on the outside diameter, as a function of the radius (from ID to OD).
Figure 13:
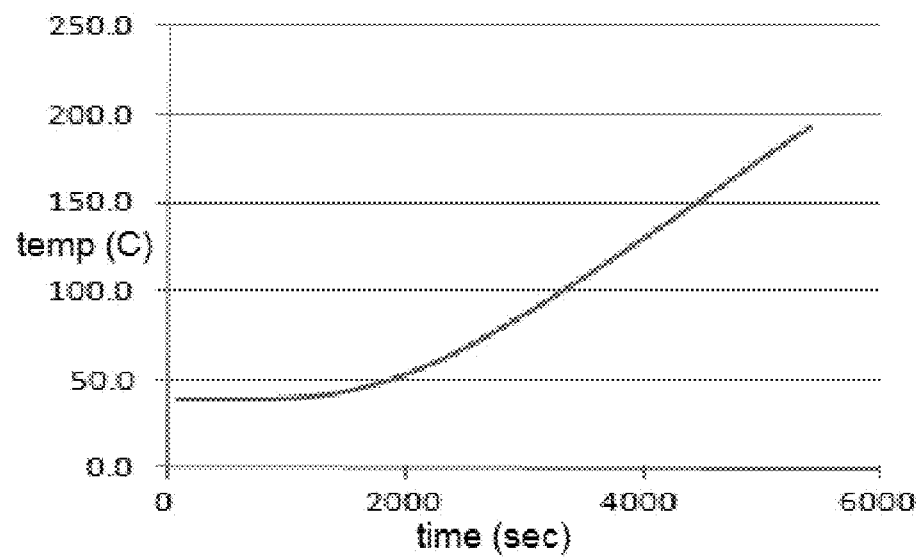
FIG. 13 is a graph showing the change in temperature of the inside of the pipe of FIG. 12 as a function of time.

In example 2, the modeled pipe has the same ID of 8", but a much thicker structural composite layer of 0.83". FIG. 12 depicts the temperature of the pipe after 4680 second (78 min.) exposure to a forced temperature of 1100° C. on the outside diameter, as a function of the radius (from ID to OD, to the outer wall including the fire-resistive layer). FIG. 13 depicts the temperature of the inside of the pipe (ID) as a function of time, which does not reach 192° C. for at least 5400 secs (or 1½ hrs).

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method for joining pipe sections in pipe system for containing corrosive petroleum products, the system comprising at least two separate pipe sections, a first pipe section and a second pipe section, the method comprising:
    positioning the first pipe section adjacent to the second pipe section, each pipe section comprising a structural layer comprising a composite material and a corrosion resistant layer for contacting the corrosive petroleum product, and a fire resistive layer;
    applying energy to join the corrosion resistant layers of the first and second pipe sections together forming a joint;
    applying an external wrap around the joint of the first and second pipe sections;
    bonding the external wrap to the joint and the composite structural layers by at least one of chemical curing and thermal treatment; and
    covering the external wrap with a layer of fire resistive material.

2. The method of claim 1, wherein the layer of fire resistive material comprises calcium silicate.

3. The method of claim 1, wherein the layer of fire resistive material comprises an intumescent material.

4. A method for joining pipe sections in pipe system for containing corrosive petroleum products, the system comprising at least two separate pipe sections, a first pipe section and a second pipe section, the method comprising:
    positioning the first pipe section adjacent to the second pipe section, each pipe section comprising a structural layer comprising a composite material and a corrosion resistant layer for contacting the corrosive petroleum product;
    applying energy to join the corrosion resistant layers of the first and second pipe sections together forming a joint;
    applying an external wrap around the joint of the first and second pipe sections;
    bonding the external wrap to the joint and the composite structural layers by at least one of chemical curing and thermal treatment, and
    applying a sufficient amount of a fire resistive material on the external wrap and the composite structural layers, to form a fire resistive layer for the pipe system to meet level II fire endurance standard according to International Maritime Organization (IMO) Resolution A.753 (18) fire testing protocol.

5. The method of claim 4, wherein the fire resistive material has a thermal conductivity of less than 0.4 W/m° C.

6. The method of claim 4, wherein the composite material has a thermal conductivity of less than 0.24 BTU-ft/hr-ft$^2$-° F.

7. The method of claim 4, wherein a sufficient amount of fire resistive material is applied on the external wrap and the composite structural layers for the pipe system to meet level I fire endurance standard according to International Maritime Organization (IMO) Resolution A.753 (18) fire testing protocol.

8. The method of claim 7, wherein a sufficient amount of fire resistive material is applied on the external wrap and the composite structural layers for the pipe system to take at least 90 minutes for an interior surface on the corrosion resistant layer to reach 190° C. in the International Maritime Organization (IMO) Resolution A.753 (18) fire testing protocol.

9. The method of claim 4, wherein the fire resistive material comprises calcium silicate.

10. The method of claim 4, wherein the fire resistive material comprises an intumescent material containing expandable inorganic material in a carrier material.

11. The method of claim 4, wherein the fire resistive material comprises an intumescent material that expands less than 100% upon reaching its SET point.

12. The method of claim 4, further comprising containing the fire resistive material within an outer jacket.

\* \* \* \* \*

UNITED STATES PATENT AND TRADEMARK OFFICE
CERTIFICATE OF CORRECTION

| | |
|---|---|
| PATENT NO. | : 9,016,324 B2 |
| APPLICATION NO. | : 12/761582 |
| DATED | : April 28, 2015 |
| INVENTOR(S) | : Edwin H. Niccolls, Andrew O'Connor and Grzegorz Jan Kusinski |

Page 1 of 1

It is certified that error appears in the above-identified patent and that said Letters Patent is hereby corrected as shown below:

On the title page item 75 - Last inventor's last name should be changed from "Jusinski" to
--Kusinski--

Signed and Sealed this
Thirteenth Day of October, 2015

Michelle K. Lee
*Director of the United States Patent and Trademark Office*